(12) United States Patent
Xiang et al.

(10) Patent No.: US 11,680,847 B2
(45) Date of Patent: Jun. 20, 2023

(54) DIGITAL SCALE WITH ENHANCED SENSING MECHANISM

(71) Applicant: Shenzhen Chenbei Technology Co., Ltd., Shenzhen (CN)

(72) Inventors: Yu Xiang, Foshan (CN); Xin Li, Guangzhou (CN)

(*) Notice: Subject to any disclaimer, the term of this patent is extended or adjusted under 35 U.S.C. 154(b) by 112 days.

(21) Appl. No.: 17/184,539

(22) Filed: Feb. 24, 2021

(65) Prior Publication Data
US 2021/0262852 A1    Aug. 26, 2021

(30) Foreign Application Priority Data
Feb. 24, 2020  (CN) .......................... 202010113130.1

(51) Int. Cl.
  *G01G 23/37*   (2006.01)
  *G01G 21/22*   (2006.01)
  *G01G 19/44*   (2006.01)

(52) U.S. Cl.
  CPC ............ *G01G 23/37* (2013.01); *G01G 19/44* (2013.01); *G01G 21/22* (2013.01)

(58) Field of Classification Search
  CPC .... G01G 19/44; G01G 21/22; G01G 21/2337; G01G 23/37
  See application file for complete search history.

(56) References Cited

U.S. PATENT DOCUMENTS

| | | | | | |
|---|---|---|---|---|---|
| 4,632,198 A | * | 12/1986 | Uchimura | .............. | G01G 21/24 177/229 |
| 4,711,314 A | * | 12/1987 | Suzuki | ................. | G01G 3/1412 177/164 |
| 4,778,016 A | * | 10/1988 | Uchimura | ............ | G01G 23/005 177/186 |
| 5,190,117 A | * | 3/1993 | Freeman | .............. | G01G 23/005 177/244 |
| 5,886,302 A | * | 3/1999 | Germanton | ............ | G01G 19/44 177/199 |
| 5,929,391 A | * | 7/1999 | Petrucelli | ................. | G01G 3/13 177/229 |
| 2009/0183928 A1 | * | 7/2009 | Oseko | ................ | G01G 23/3728 177/211 |
| 2016/0153826 A1 | * | 6/2016 | Oneid | .................... | G01G 21/22 177/211 |

* cited by examiner

*Primary Examiner* — Randy W Gibson
(74) *Attorney, Agent, or Firm* — Tsz Lung Yeung

(57) ABSTRACT

A digital scale includes a weighing platform, a plurality of weight sensors, and a central processing unit. Each of the weight sensors includes a first sensing mechanism and a second sensing mechanism. The first sensing mechanism includes a first elastic member, and a first movement detection device arranged to transform a movement of the first elastic member to a first electrical signal. The second sensing mechanism includes, a second elastic member and a second movement detection device arranged to transform a movement of the second elastic member to a second electrical signal. When an external load greater than a predetermined threshold is applied on the weighing platform, the first elastic member is arranged to be driven to move and in turn pushes the second elastic member to move. A measurement of the external load is obtained by combining and the first electrical signal and the second electrical signal.

14 Claims, 7 Drawing Sheets

DIGITAL SCALE WITH ENHANCED SENSING MECHANISM

CROSS REFERENCE TO RELATED APPLICATION

This is a non-provisional application which claims priority to a Chinese patent application having an application number of CN 202010113130.1, and a filing date of Feb. 24, 2020, the entire contents of which is hereby incorporated by reference.

BACKGROUND

Field of Invention

Embodiments of the present disclosure relates to a scale, and more particularly to a digital scale comprising a plurality of weight sensors which is capable of distributing an external load on two sensing mechanisms so as to prevent damage to any one of the sensing mechanisms without affecting an overall accuracy of the digital scale.

Description of Related Arts

Digital scales have widely been used through the world. A conventional digital scale usually comprises a main body having an upper measuring panel, and a weight sensor provided in the main body for sensing a weight exerted on the upper measuring panel of the main body. Very often, the weight sensor usually comprises a spring or an elastic member so that when the upper measuring panel is subject to external weight, the spring or the elastic member is arranged to be deformed and the resulting deformation is then be measured by a transducer. The result of this measurement may then be displayed on a screen.

A major disadvantage of conventional digital scales such as the one described above is that when the digital scales have been used for a certain period of time, the springs or the elastic member may be physically deformed so that their designed elasticity may be altered by corresponding mechanical failure or deformation. The result is that the accuracy of the digital scale will decrease. In order to address this problem, some manufacturers may increase the thickness of the elastic pieces in an attempt to minimize distortion thereof. However, doing so may adversely affect an overall accuracy of the digital scales.

As a result, there is a need to develop a digital scale which is capable of increasing measurement accuracy and at the same time minimizing malfunctioning of weight sensors.

SUMMARY

Implementations of the present disclosure provide a digital scale comprising a plurality of weight sensors which is capable of distributing an external load on two sensing mechanisms so as to prevent damage to any one of the sensing mechanisms without affect an overall accuracy of the digital scale.

Implementations of the present disclosure provide a digital scale comprising a plurality of weight sensors each of which comprising a blocking member for preventing an elastic member from being excessively deformed so as to prevent damage thereof.

In one aspect of the present disclosure, it provides a digital scale, comprising:

a weighing platform;

a plurality of weight sensors provided underneath the weighing platform, each of the weight sensors comprising:

a first sensing mechanism which comprises a first securing member, a first elastic member movably attached on the first securing member, and a first movement detection device connected to the first elastic member, the first movement detection device being arranged to transform a movement of the first elastic member to a corresponding first electrical signal;

a second sensing mechanism provided between the first sensing mechanism and the weighing platform, the second sensing mechanism comprising a second securing member, a second elastic member movably attached on the second securing member, and a second movement detection device connected to the second elastic member, the second movement detection device being arranged to transform a movement of the second elastic member to a corresponding second electrical signal, wherein when an external load which is greater than a predetermined threshold is applied on the weighing platform, the first elastic member is arranged to be driven to move by the external load and push the second elastic member to move with respect to the second securing member; and a central processing unit electrically connected to the first sensing mechanism and the second sensing mechanism, a magnitude of the external load being obtained by combining and processing the first electrical signal and the second electrical signal.

In another aspect of the present invention, it provides a digital scale, comprising:

a weighing platform;

a plurality of weight sensors provided underneath the weighing platform, each of the weight sensors comprising:

a first sensing mechanism which comprises a first securing member, a first elastic member movably attached on the first securing member, and a first movement detection device connected to the first elastic member in such a manner that when an external load is applied on the weighing platform, the first elastic member is arranged to be driven to move by the external load, the first movement detection device being arranged to transform a movement of the first elastic member to a corresponding first electrical signal;

a blocking member positioned above the first elastic member for limiting an extent of deformation of the first elastic member, the blocking member being configured to have an elongated structure having one end connected to the weighing platform and a lower biasing end extending toward the first elastic member for limiting the first elastic member; and a central processing unit electrically connected to the first sensing mechanism, a magnitude of the external load being obtained by processing the first electrical signal.

This summary presented above is provided merely to introduce certain concepts and not to identify any key or essential features of the claimed subject matter.

DETAILED DESCRIPTION OF THE PREFERRED EMBODIMENT

Figure 1:
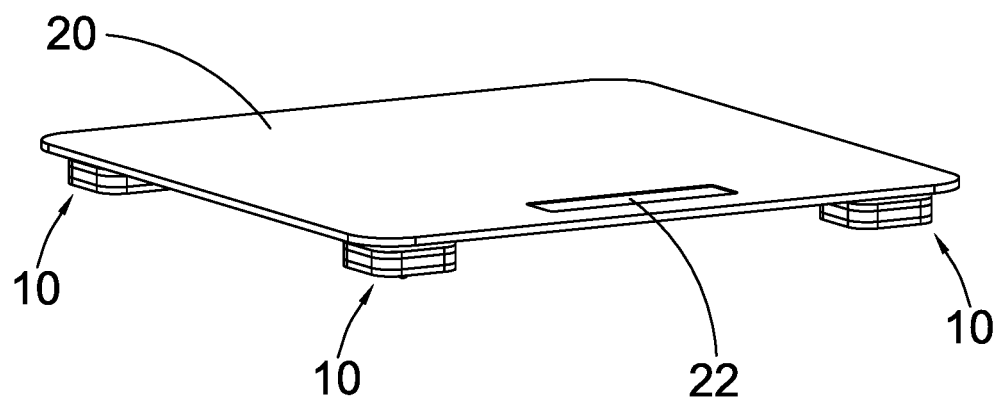
FIG. 1 is a perspective view of a digital scale according to a preferred embodiment of the present invention.

The following detailed description of the embodiments is the preferred mode of carrying out the present disclosure. The description is not to be taken in any limiting sense. It is presented for the purpose of illustrating the general principles of embodiments of the present disclosure.

It should be appreciated that the terms "install", "connect", "couple", and "mount" in the following description refer to the connecting relationship in the accompanying drawings for easy understanding of embodiments of the present disclosure. For example, the connection can refer to permanent connection or detachable connection. Furthermore, "connected" may also mean direct connection or indirect connection, or connection through other auxiliary components. Therefore, the above terms should not be an actual connection limitation of the elements of embodiments of the present disclosure.

It should be appreciated that the terms "length", "width", "top", "bottom", "front", "rear", "left", "right", "vertical", "horizontal", "upper", "lower", "exterior", and "interior" in the following description refer to the orientation or positioning relationship in the accompanying drawings for easy understanding of embodiments of the present disclosure without limiting the actual location or orientation of embodiments of the present disclosure. Therefore, the above terms should not be an actual location limitation of the elements of embodiments of the present disclosure.

It should be appreciated that the terms "first", "second", "one", "a", and "an" in the following description refer to "at least one" or "one or more" in the embodiment. In particular, the term "a" in one embodiment may refer to "one" while in another embodiment may refer to "more than one". Therefore, the above terms should not be an actual numerical limitation of the elements of embodiments of the present disclosure.

Referring to FIG. 1 to FIG. 4 of the drawings, a digital scale according to a preferred embodiment of the present invention is illustrated. Broadly, the digital scale may comprise a weighing platform 20, a plurality of weight sensors 10 provided underneath the weighing platform 20 and a central processing unit 30. The digital scale may be arranged to measure a weight of an object or human body disposed on or standing on the weighing platform 20.

Each of the weight sensors 10 may comprise a first sensing mechanism 11 and a second sensing mechanism 121. The first sensing mechanism 11 may comprise a first securing member 111, a first elastic member 112 movably attached on the first securing member 111, and a first movement detection device 114 connected to the first elastic member 112. The first movement detection device 114 may be arranged to transform a movement of the first elastic member 112 to a corresponding first electrical signal.

The second sensing mechanism 121 may be provided between the first sensing mechanism 11 and the weighing platform 20. The second sensing mechanism 121 may comprise a second securing member 1211, a second elastic member 1212 movably attached on the second securing member 1211, and a second movement detection device 1214 connected to the second elastic member 1212. The second movement detection device 1214 may be arranged to transform a movement of the second elastic member 1212 to a corresponding second electrical signal. When an external load which is greater than a predetermined threshold is applied on the weighing platform 20, the first elastic member 112 may be arranged to be driven to move by the external load and push the second elastic member 1212 to move with respect to the second securing member 1211.

The central processing unit 30 may be electrically connected to the first sensing mechanism 11 and the second sensing mechanism 121, wherein a magnitude of the external load may be obtained by combining and processing the first electrical signal and the second electrical signal. At the same time, the load applied to each of the weight sensors 10 may be effectively distributed among the corresponding first sensing mechanism 11 and the corresponding second mechanism 121 so as to prevent damage to either one of the first sensing mechanism 11 and the second sensing mechanism 121.

Referring to FIG. 1 of the drawings, the weighing platform 20 may be configured as a panel-like structure which allows a user to step thereon. The weighing platform 20 may be configured from rigid materials such as plastic, glass or other similar materials for securely supporting the weight of the object or the weight of the user. The digital scale may further comprise a display screen 22 provided on the weighing platform 20 for displaying measurement results of the weight sensors 10. As examples, the display screen 22 may be configured as LCD or LED display. Other forms of displays may also be possible.

Figure 2:
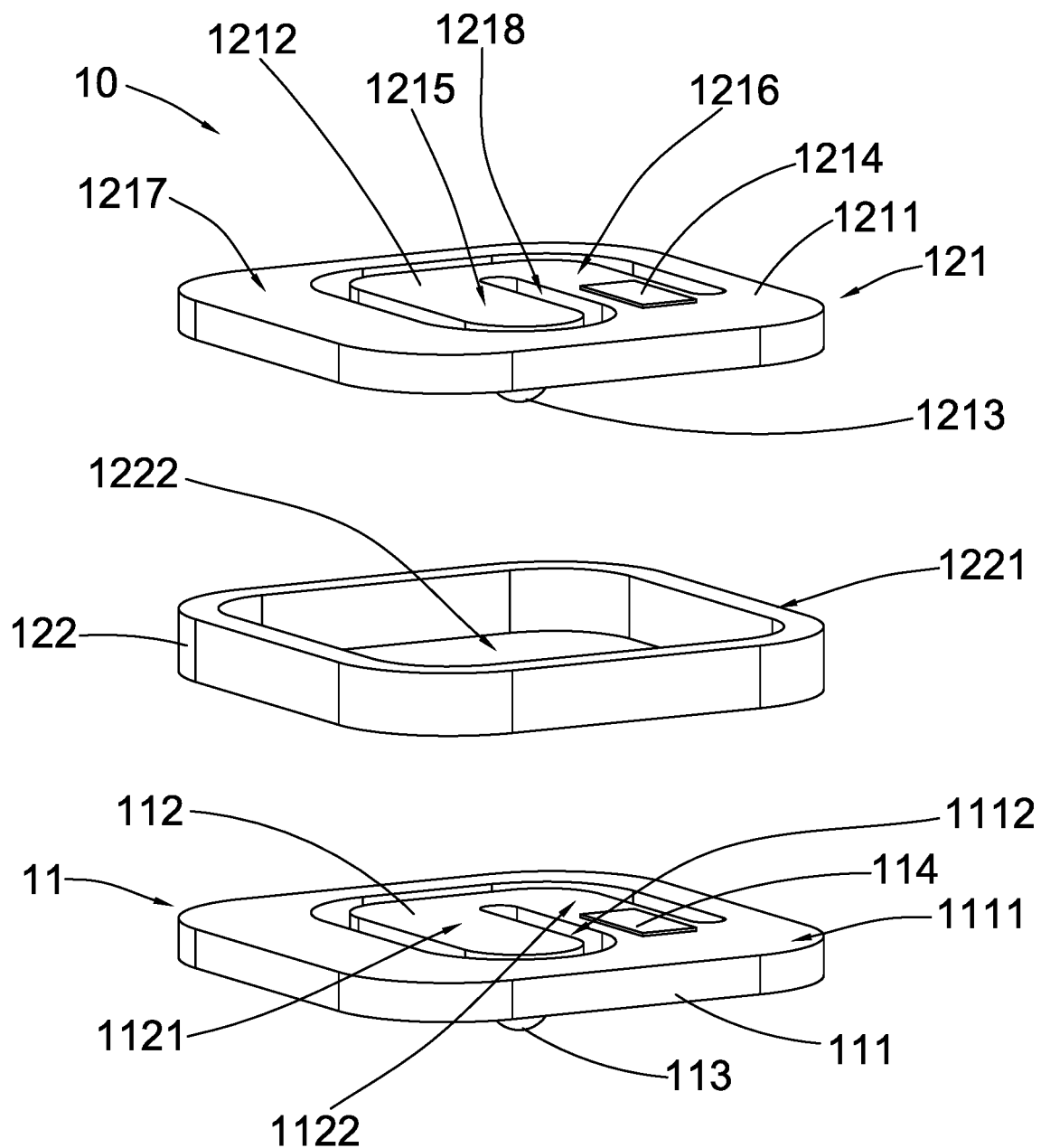
FIG. 2 is an exploded perspective view of a weight sensor of the digital scale according to the preferred embodiment of the present invention.
Figure 3:
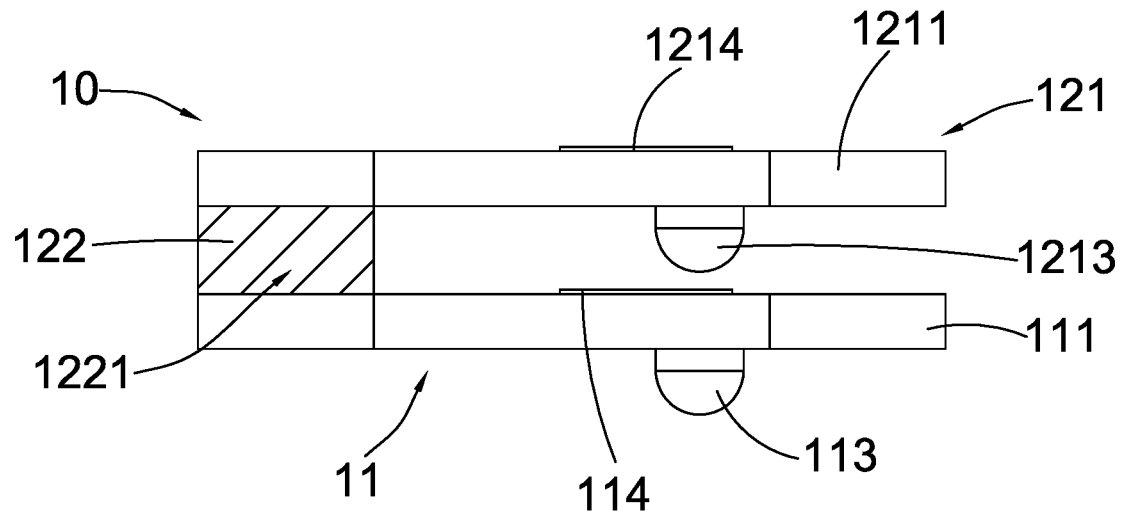
FIG. 3 is a schematic diagram of the weight sensor of the digital scale according to the preferred embodiment of the present invention.
Figure 4:
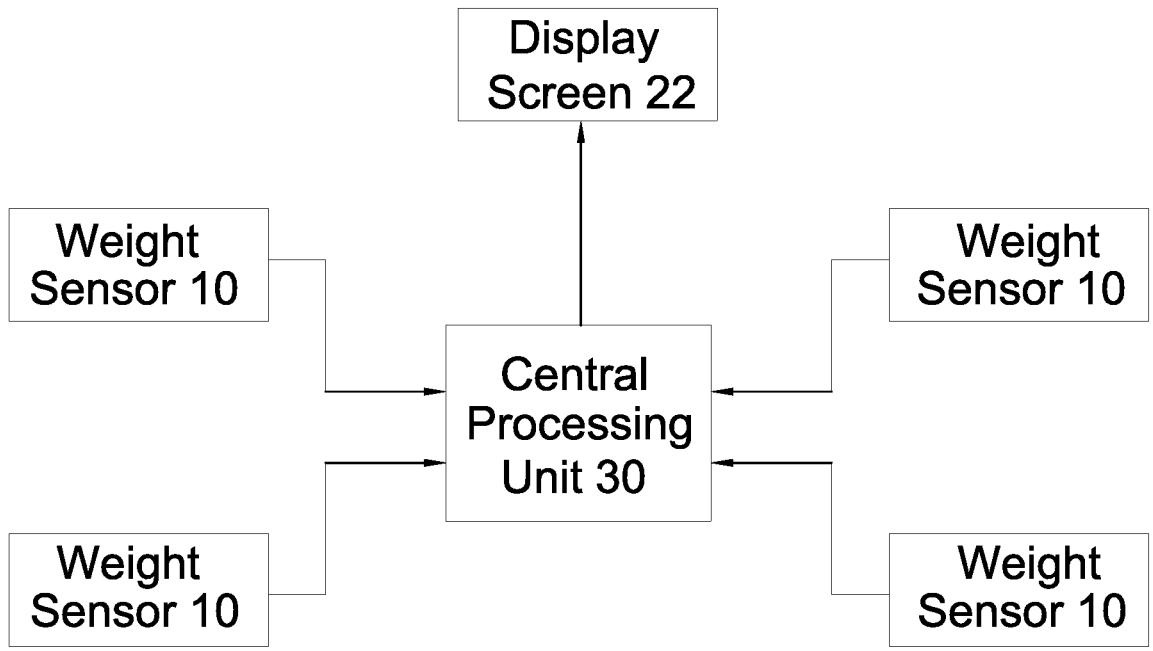
FIG. 4 is a block diagram illustrating an electrical connection between the weight sensors and a central processing unit of the digital scale according to the preferred embodiment of the present invention.

As shown in FIG. 1 to FIG. 3 of the drawings, the first sensing mechanism 11 may further comprise a first protruding member 113 extended from the first elastic member 112 from an opposite side of the second sensing mechanism 112, wherein the first protruding member 113 may be arranged to normally bias against or stand on a flat surface (such as on the ground) so that when the external load is applied on the weighing platform 20, the first protruding member 113 may be driven to move upwardly by a corresponding reaction force so as to drive the first elastic member 112 to move toward the second sensing mechanism 121.

On the other hand, the second sensing mechanism 112 may further comprise a second protruding member 1213 extended from the second elastic member 1212 toward the first sensing mechanism 11, in such a manner that when the first elastic member 112 is pushed toward the second sensing mechanism 112, the first elastic member 112 may be arranged to eventually bias against the second protruding member 1213 which may then drive the second elastic member 1212 to move correspondingly. Thus, the second protruding member 1213 may be positioned in mechanical communication with the first elastic member 112 so that the first elastic member 112 may drive to move the second protruding member 1213 and the second elastic member 1212. In this preferred embodiment, the second protruding member 1213 may be positioned above the first elastic member 112 and aligned with the first protruding member 113. However, the first sensing member 11 and the sensing mechanism 121 may be arranged in any suitable configuration as long as they have mechanical communications.

It is worth mentioning that a distance between the second protruding member 1213 and the first elastic member 112 may be adjusted by the manufacturer of the present invention so as to fit the various circumstances in which the present invention is used. Moreover, the second protruding member 1213 and the first elastic member 112 may be positioned to bias against each other (i.e. the second protruding member 1213 and the first elastic member 112 does not space apart from each other and normally touching each other) so that the external load may push the first elastic member 112 and the second elastic member 1212 to move simultaneously without needing to reach the predetermined threshold.

As shown in FIG. 2 of the drawings, the first securing member 111 may have a first boundary portion 1111 and a first through cavity 1112 formed within the first boundary portion 1111. On the other hand, the first elastic member 112 may extend from the first boundary portion 1111 and be positioned in the first through cavity 1112.

More specifically, the first elastic member 112 may have a first elastic portion 1121 and a second elastic portion 1122. The second elastic portion 1122 may extend from the first boundary portion 1111 of the first securing member 111, while the first elastic portion 1121 may extend from the second elastic portion 1122 to form a substantially C-shaped cross section of the first elastic member 112 when viewed from the top. In this preferred embodiment of the present invention, the first movement detection device 114 may be attached on the second elastic portion 1122 of the first elastic member 112.

Thus, the first elastic member 112 may extend from the first boundary portion 1111 to the first through cavity 1112 in a suspended manner. On the other hand, the first elastic member 112 may have a predetermined elasticity so that it may slightly deform with respect to the first securing member 111. This mechanical deformation may correspond to the load exerted thereon. As a result, when the external load is applied on the weighing platform 20, a corresponding reaction force of the external load may be exerted on the first protruding member 113, making the first elastic member 112 to deform toward the second elastic member 1212.

The first protruding member 113 may be protruded from the first elastic portion 1121 of the first elastic member 112 toward an opposite side of the second sensing mechanism 12. Preferably, the first protruding member 113 may extend from the first elastic portion 1121 and may be arranged to rest on the ground.

On the other hand, the second securing member 121 may have a second boundary portion 1217 and a second through cavity 1218 formed within the second boundary portion 1217. The second elastic member 1212 may extend from the second boundary portion 1217 and be positioned in the second through cavity 1218.

The second elastic member 1212 may have a third elastic portion 1215 and a fourth elastic portion 1216. The fourth elastic portion 1216 may extend from the second boundary portion 1217 of the second securing member 121, while the third elastic portion 2115 may extend from the fourth elastic portion 1216 to form a substantially C-shaped cross section of the second elastic member 1212 when viewed from the top. This structure is similar to that of the first elastic member 112 described above. The second movement detection device 1214 may be attached on the fourth elastic portion 1216 of the second elastic member 1212.

The second protruding member 1213 may be protruded from the third elastic portion 1215 of the second elastic member 1212 toward the first sensing mechanism 11. Preferably, the second protruding member 1213 may extend from the third elastic portion 1215 at a position right above the first elastic portion 1121.

Each of the first movement detection device 114 and the second movement detection device 1214 may be configured as a strain gauge which may be arranged to transform a mechanical displacement into a corresponding electrical signal. When the first elastic member 112 and the second elastic member 1212 are driven to move by the external load, the resulting mechanical displacement of the first movement detection device 114 and the second movement detection device 1214 may be converted to the first electrical signal and the second electrical signal respectively and these electrical signals may be transmitted to the central processing unit 30 for further processing.

As shown in FIG. 3 of the drawings, in this preferred embodiment of the present invention, the first movement detection device 114 and the second movement detection device 1214 may be positioned coaxially (i.e. aligned with each other). The first protruding member 113 and the second protruding member 1213 may also be positioned coaxially and aligned with each other.

The second sensing mechanism 121 may further comprise a retention member 122 extended between the first securing member 11 and the second securing member 1211 so as to maintain a predetermined distance between the first securing member 11 and the second securing member 1211. This predetermined distance may allow movement of the first elastic member 112 toward the second elastic member 1212. As shown in FIG. 3 of the drawings, the retention member 122 may integrally extend from the second securing member 1211 at the second boundary portion 1217 thereof and may connect to the first securing member 111 at the first boundary portion 1111 thereof.

The retention member 122 may be configured as having a loop-shaped structure sandwiched between the first securing member 111 and the second securing member 1211. Thus, the retention member 122 may have a peripheral portion 1221 and a central cavity 1222 formed within the peripheral portion 1221, wherein the first elastic member 112 may move to bias against the second elastic member 1212 through the central cavity 1222. The peripheral portion 1221 may be integrally connected to the second securing member 1211.

The central processing unit 30 may be configured as an integrated chip which may be programmed to process all the electrical signals transmitted from the first movement detection device 114 and the second movement detection device 1214 and determine an overall weight of the load exerted on the weighing platform 20.

The operation of the present invention is as follows: when an external load is applied on the weighing platform 20, the first protruding member 113 may be driven to move toward the second sensing mechanism 12. The first protruding member 113 may be arranged to drive the first elastic member 112 to move correspondingly, thus causing mechanical deformation thereof. When the external load reaches a predetermined threshold, the first elastic member 112 may be deformed to push the second protruding member 1213 and the second elastic member 1212, causing the second elastic member 1212 to deform as well. The deformation of the first elastic member 112 and the second elastic member 1212 may be measured by the first movement detection device 114 and the second movement detection device 1214 which then convert the movement into corresponding electrical signals respectively. The electrical signals may then be processed by the central processing unit 30 which may combine the weight measured by all weight sensors and determine the total weight applied on the weighing platform 20.

In one situation where the vertical distance between the second protruding member 1213 and the first elastic member 112 is a predetermined distance above 0 mm, and suppose that the weight applied on a particular weight sensor 10 is around 100 KG, and the maximum weight measurable by each of the first sensing mechanism 11 and the second sensing mechanism 121 is around 100 KG. Before the first elastic member 112 biases against the second protruding member 1213, suppose that the first elastic member 112 is deformed such that the corresponding weight reading as measured by the first movement detection device 114 is 60 KG, continuing deforming the first elastic member 112 causes the first elastic member 112 to bias against the second protruding member 1213 and cause the second elastic member 1212 to deform as well. Suppose that the additional deformation of the first elastic member 112 amounts to an additional 20 KG weight and the deformation of the second elastic member 1212 as measured by the second movement detection device 1214 is 20 KG, the total weight as measured by the digital scale will therefore be 60 KG+20 KG+20 KG=100 KG.

In another situation where the vertical distance between the second protruding member 1213 and the first elastic member 112 is approximately 0 mm, the first elastic member 112 and the second elastic member 1212 may be deformed simultaneously and in a synchronized manner. Suppose that the maximum weight measurable by each of the first sensing mechanism 11 and the second sensing mechanism 121 is around 100 KG, and the corresponding weight reading as measured by each of the first movement detection device 114 and the second movement detection device 1212 is 50 KG, the total weight as measured by the digital scale will therefore be 50 KG+50 KG=100 KG.

From the forgoing description, one skilled in the art may appreciate that the overall load exerted on the weighing platform 20 may be effectively distributed among the first elastic member 112 and the second elastic member 1212 so as to prevent each of the first elastic member 112 and the second elastic member 1212 from being subject to excessive loading without needing to increase a thickness of either or both of the first elastic member 112 and the second elastic member 1212.

Figure 5:
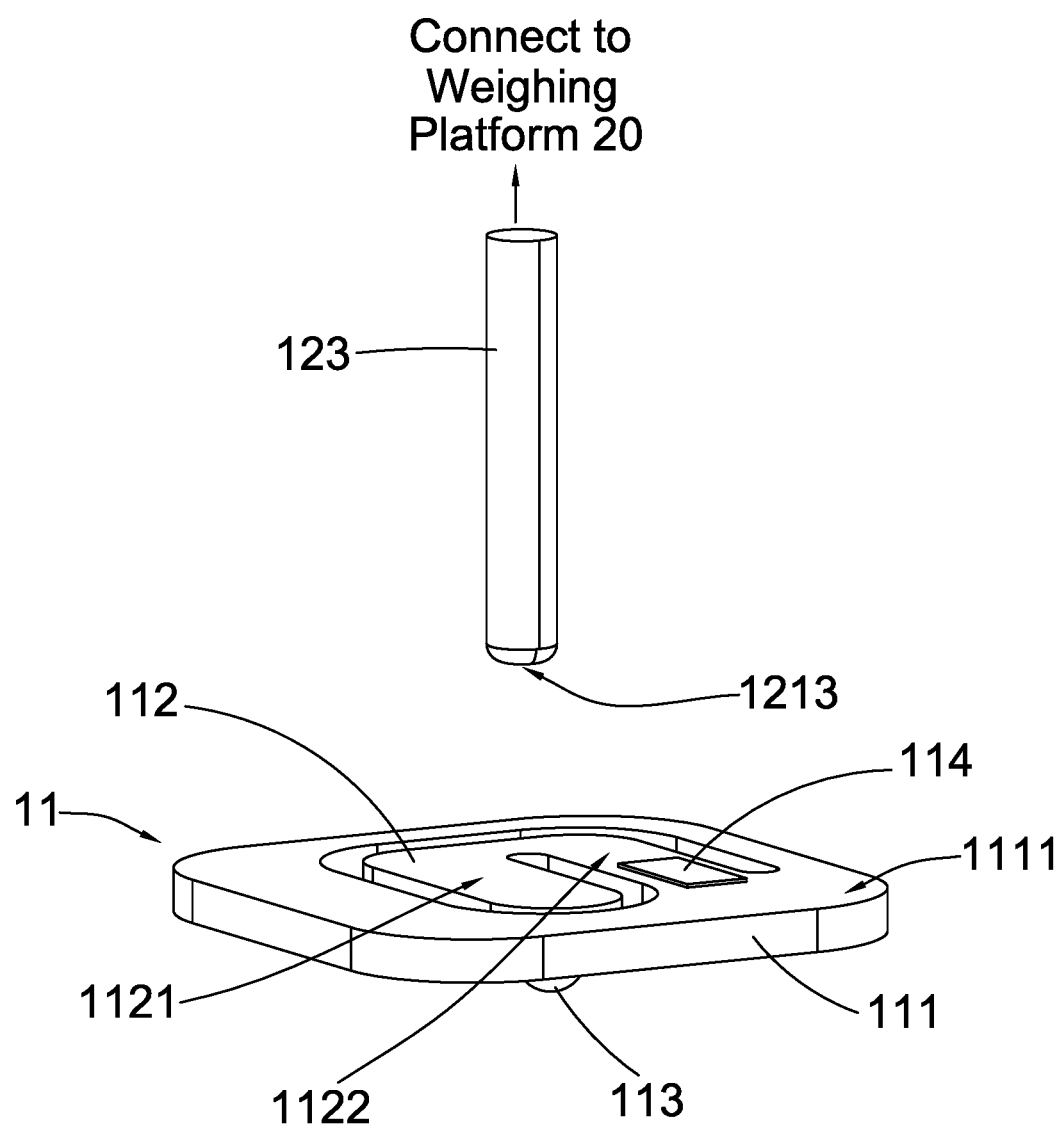
FIG. 5 is a first alternative mode of the digital scale according to the preferred embodiment of the present invention.

Referring to FIG. 5 of the drawings, a first alternative mode of the digital scale according to the preferred embodiment of the present invention is illustrated. The first alternative mode is similar to the preferred embodiment as mentioned above, except the second sensing mechanism may be omitted from the weight sensors 10, while each of the weight sensors 10 may further comprise a blocking member 123 positioned above the first elastic member 112 for limiting the extent of deformation of the first elastic member 112.

According to the first alternative mode of the present invention, the blocking member 123 may be configured as having an elongated structure having one end connected to the weighing platform 20 and extend toward the first elastic member 112. Thus, the deformation of the first elastic member 112 may be limited or blocked by a lower biasing end 1231 of the blocking member 123.

It is worth mentioning that the position of the blocking member 123 may be such that when the lower biasing end 1231 biases against the first elastic member 112, the maximum possible deformation of the first elastic member 112 has not been reached so that the blocking member 123 may effectively prevent permanent mechanical damage to the first elastic member 112. In the first alternative mode of the present invention, the blocking member 123 and the first protruding member 113 may be aligned with each other. Moreover, a vertical distance between the lower biasing end 1231 of the blocking member 123 and the first elastic member 112 may be 0 mm to 5 mm. The exact distance may depend on the circumstances in which the present invention is manufactured or marketed.

Figure 6:
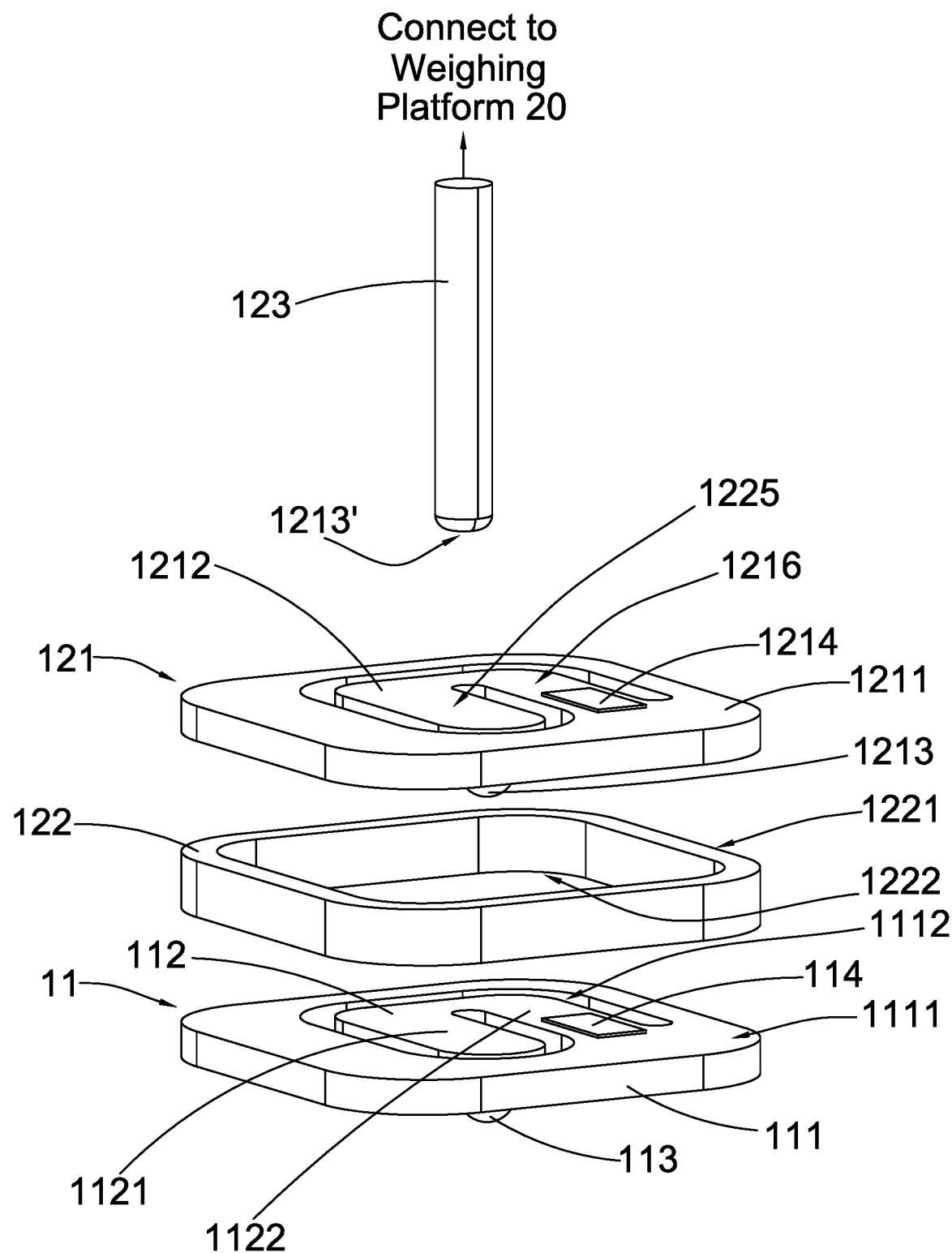
FIG. 6 is a second alternative mode of the digital scale according to the preferred embodiment of the present invention.

Referring to FIG. 6 of the drawings, a second alternative mode of the digital scale according to the preferred embodiment of the present invention is illustrated. The second alternative mode is similar to the preferred embodiment as mentioned above, except each of the weight sensors 10 may further comprise a blocking member 123' positioned above the second elastic member 1212 for limiting the extent of deformation of the second elastic member 1212 and the first elastic member 112.

According to the second alternative mode of the present invention, the blocking member 123' may be configured as having an elongated structure having one end connected to the weighing platform 20 and extend toward the second elastic member 1212. Thus, the deformation of the second elastic member 1212 and thus the first elastic member 112 may be limited or blocked by a lower biasing end 1231' of the blocking member 123'.

It is worth mentioning that the position of the blocking member 123' may be such that when the lower biasing end 1231' biases against the second elastic member 1212, the maximum possible deformation of the second elastic member 1212 has not been reached so that the blocking member 123' may effectively prevent permanent mechanical damage to the second elastic member 1212. At the same time, the maximum possible deformation of the first elastic member 112 has not been reached so that the blocking member 123' may also prevent permanent mechanical damage to the first elastic member 112.

In the second alternative mode of the present invention, the blocking member 123', the second protruding member 1213 and the first protruding member 113 may all be aligned with each other, wherein a vertical distance between the lower biasing end 1231' of the blocking member 123' and the second elastic member 1212 may be 0 mm to 5 mm. Moreover, a vertical distance between the second protruding member 1213 and the first elastic member 112 may be 0 mm to 5 mm. Again, the exact distance may depend on the circumstances in which the present invention is manufactured or marketed.

In order to better protect the first elastic member 112 from damage, a coefficient of elasticity of the second elastic member 1212 may be larger than that of the first elastic member 112. Furthermore, a thickness of the second elastic member 1212 may be greater than that that of the first elastic member 112.

When an external load is exerted on the weighing platform 20, the first protruding member 113 may be pushed by a corresponding reaction force so that the first elastic member 112 is pushed toward the second elastic member 1212. When the external load is large enough, the first elastic member 112 may be pushed to eventually bias against the second protruding member 1213 through the central cavity 1222 of the retention member 122. The remaining force may continue pushing the second elastic member 1212, causing the second elastic member 1212 to deform as well. The deformation of the first elastic member 112 and the second elastic member 1212 may be measured by the first movement detection device 114 and the second movement detection device 1214. The overall measurement result may be obtained by processing the electrical signals transmitted from the first movement detection device 114 and the second movement detection device 1214.

Moreover, the deformation of the first elastic member 112 and the second elastic member 1212 may be effectively limited by the blocking member 123' so as to prevent the first elastic member 112 and the second elastic member 1212 from being deformed excessively.

Figure 7:
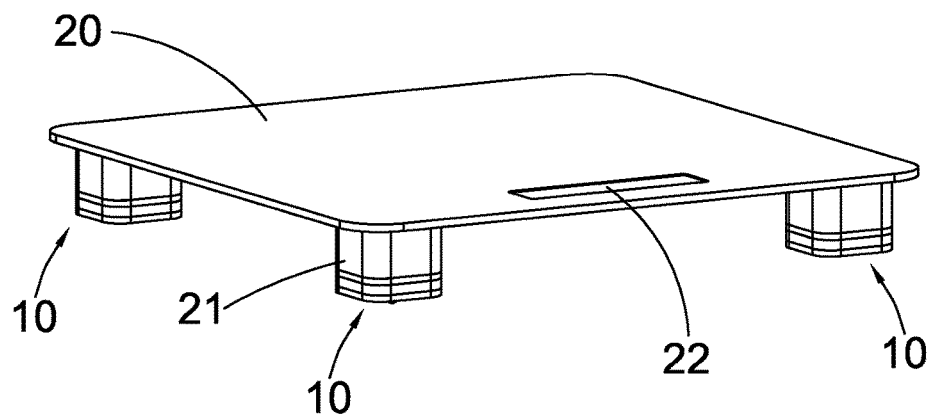
FIG. 7 is a third alternative mode of the digital scale according to the preferred embodiment of the present invention.
Figure 8:
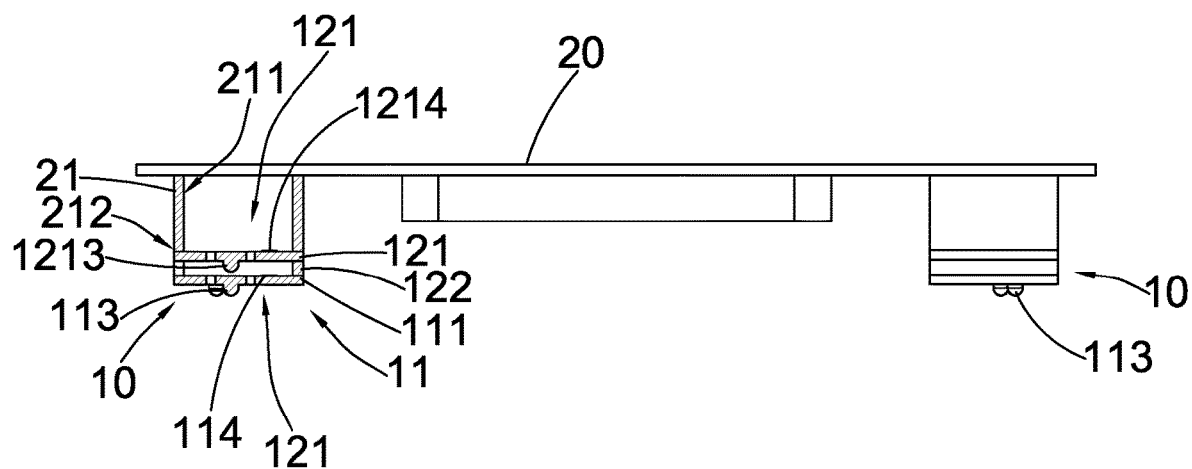
FIG. 8 is a schematic diagram of the digital scale according to the third alternative mode of the preferred embodiment of the present invention.

Referring to FIG. 7 to FIG. 8 of the drawings, a third alternative mode of the digital scale according to the preferred embodiment of the present invention is illustrated. The third alternative mode is similar to the preferred embodiment as mentioned above, except the digital scale may further comprise a plurality of supporting legs 21 mounted underneath the weighing platform 20 and connected to the weight sensors 10 respectively, wherein the first sensing mechanism 11 and the second sensing mechanism 121 may be supported by the corresponding supporting leg 21. Thus, each of the supporting legs 21 may be configured to have a tubular structure for connecting with and supporting the first sensing mechanism 11 and the second sensing mechanism 121.

According to the third alternative mode of the present invention, each of the supporting legs 21 may have one end 211 connected to the weighing platform 20, and another end 212 connected to the corresponding second securing member 1211 of the second securing member 121. The second securing member 121 may be connected to the first securing member 11 through the retention member 122. The weighing platform 20, the first sensing mechanism 11 and the second sensing mechanism 121 in the third alternative mode may be structurally identical to what was described in the preferred embodiment above.

When an external load is applied on the weighing platform 20, the load may be transmitted to the weight sensors 10 through the supporting legs 21 respectively. The external load may cause the first protruding member 113 to be driven to move toward the second sensing mechanism 12. The first protruding member 113 may be arranged to drive the first elastic member 112 to move correspondingly, thus causing mechanical deformation thereof. When the external load reaches a predetermined threshold, the first elastic member 112 may be deformed to push the second protruding member 1213 and the second elastic member 1212 through the central cavity 1222 of the retention member 122, causing the second elastic member 1212 to deform as well. The deformation of the first elastic member 112 and the second elastic member 1212 may be measured by the first movement detection device 114 and the second movement detection device 1214 which then convert the movement into corresponding electrical signals respectively. The electrical signals may then be processed by the central processing unit 30 which may combine the weight measured by all weight sensors and determine the total weight applied on the weighing platform 20. These operations are similar to that described in the preferred embodiment above.

Figure 9:
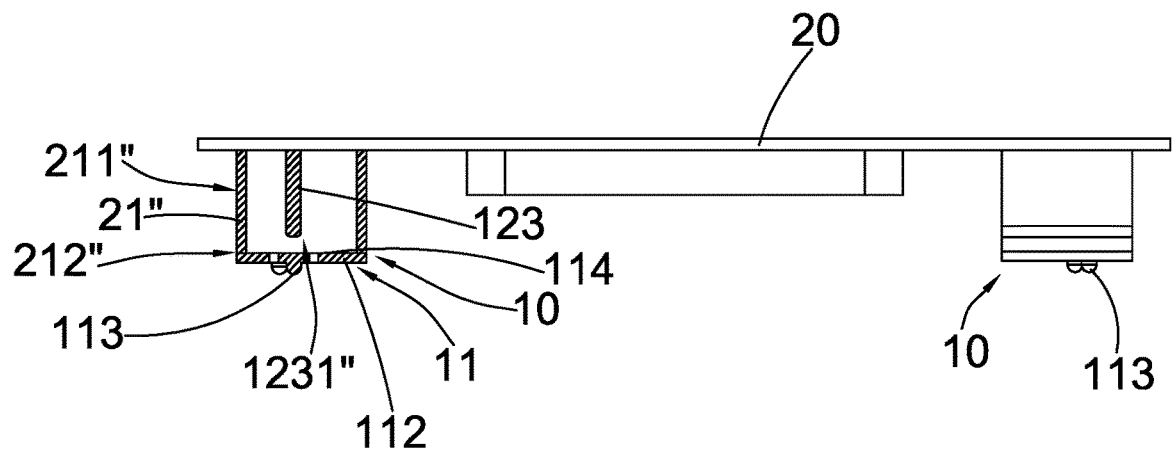
FIG. 9 is a fourth alternative mode of the digital scale according to the preferred embodiment of the present invention.

Referring to FIG. 9 of the drawings, a fourth alternative mode of the digital scale according to the preferred embodiment of the present invention is illustrated. The fourth alternative mode is similar to the first alternative mode described above, except the digital scale may further comprise a plurality of supporting legs 21" mounted underneath the weighing platform 20. Similar to the first alternative mode described above, the second sensing mechanism may be omitted from the weight sensors 10, while each of the weight sensors 10 may further comprise a blocking member 123" positioned above the first elastic member 112 for limiting the extent of deformation of the first elastic member 112. The blocking member 123" may be positioned above the first elastic member 121 and may substantially align with the first protruding member 113. The blocking member 123" may have an elongated structure having one end connected to the weighing platform 20, and a lower biasing end 1231" extended to a position spacedly above the first elastic member 112. The first movement detection device 114 may be attached on the first elastic member 112 as in the case of the preferred embodiment.

Each of the supporting legs 21" may be configured to have a tubular structure for connecting with and supporting the first sensing mechanism 11. According to the fourth alternative mode of the present invention, each of the supporting legs 21" may have one end 211" connected to the weighing platform 20, and another end 212" connected to the corresponding first securing member 11 of the first sensing mechanism 11.

When an external load is applied on the weighing platform 20, the load may be transmitted to the weight sensors 10 through the supporting legs 21" respectively. The external load may cause the first protruding member 113 to be driven to move toward the blocking member 123". The first protruding member 113 may be arranged to drive the first elastic member 112 to move correspondingly, thus causing mechanical deformation thereof. The deformation may be measured by the first movement detection device 114. When the external load is too large and the resulting deformation of the first elastic member 112 reaches a predetermined threshold, further deformation of the first elastic member 112 may be effectively blocked by the blocking member 123" so as to prevent the first elastic member 112 from having mechanical damage.

It is worth mentioning that the position of the blocking member 123" may be such that when the lower biasing end 1231" biases against the first elastic member 112, the maximum possible deformation of the first elastic member 112 has not been reached so that the blocking member 123" may effectively prevent permanent mechanical damage to the first elastic member 112. The weighing platform 20 and the first sensing member 11 in this fourth alternative mode may be structurally identical to what was described in the preferred embodiment above.

Figure 10:
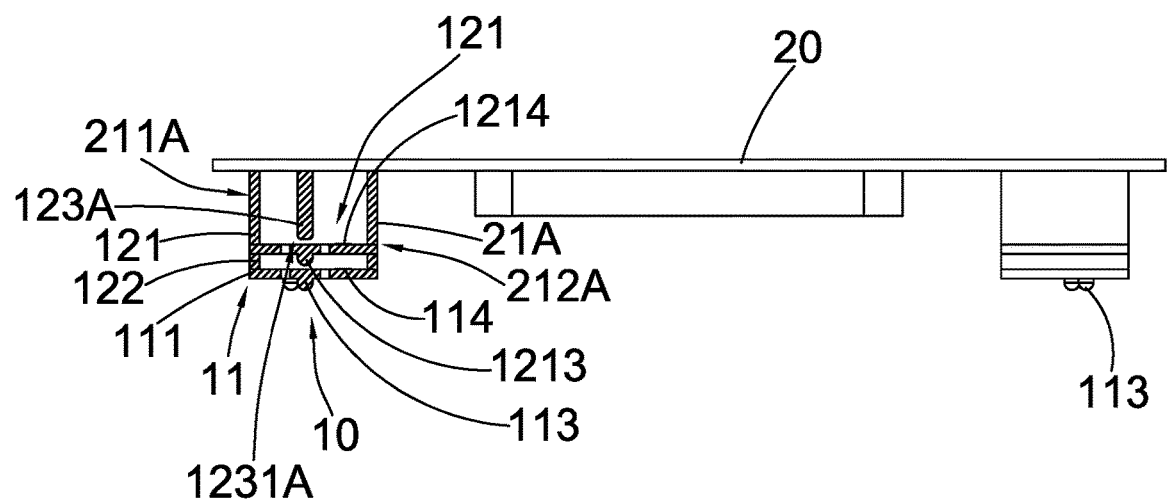
FIG. 10 is a fifth alternative mode of the digital scale according to the preferred embodiment of the present invention.

Referring to FIG. 10 of the drawings, a fifth alternative mode of the digital scale according to the preferred embodiment of the present invention is illustrated. The fifth alternative mode is a slight modification of the second alternative mode described above. According to the fifth alternative mode, each of the weight sensors 10 may further comprise a blocking member 123A positioned above the second elastic member 1212 for limiting the extent of deformation of the second elastic member 1212 and the first elastic member 112.

The blocking member 123A may be configured as having an elongated structure having one end connected to the weighing platform 20 and extend toward teach the second elastic member 1212. Thus, the deformation of the second elastic member 1212 and thus the first elastic member 112 may be limited or blocked by a lower biasing end 1231A of the blocking member 123A.

It is worth mentioning that the position of the blocking member 123A may be such that when the lower biasing end 1231A biases against the second elastic member 1212, the maximum possible deformation of the second elastic member 1212 has not been reached so that the blocking member 123A may effectively prevent permanent mechanical damage to the second elastic member 1212. At the same time, the deformation of the first elastic member 112 has not been reached so that the blocking member 123A may also prevent permanent mechanical damage to the first elastic member 112.

In the fifth alternative mode of the present invention, the blocking member 123A, the second protruding member 1213 and the first protruding member 113 may all be aligned with each other, wherein a vertical distance between the lower biasing end 1231A of the blocking member 123A and the second elastic member 1212 may be 0 mm to 5 mm. Moreover, a vertical distance between the second protruding member 1213 and the first elastic member 112 may be 0 mm to 5 mm. The exact distance may depend on the circumstances in which the present invention is manufactured or marketed.

In order to better protect the first elastic member 112 from damage, a coefficient of elasticity of the second elastic member 1212 may be larger than that of the first elastic member 112. Furthermore, a thickness of the second elastic member 1212 may be greater than that that of the first elastic member 112.

The digital scale may further comprise a plurality of supporting legs 21A mounted underneath the weighing platform 20, wherein the first sensing mechanism 11 and the second sensing mechanism 121 may be supported by the corresponding supporting legs 21A. Thus, each of the supporting legs 21A may be configured to have a tubular structure for connecting with and supporting the corresponding first sensing mechanism 11 and the corresponding second sensing mechanism 12.

According to the fifth alternative mode of the present invention, each of the supporting legs 21A may have one end 211A connected to the weighing platform 20, and another end 212A connected to the corresponding second securing member 1211 of the second securing member 121. The second securing member 121 may be connected to the first securing member 11 through the retention member 122.

When an external load is applied on the weighing platform 20, the load may be transmitted to the weight sensors 10 through the supporting legs 21A respectively. The external load may cause the first protruding member 113 to be driven to move toward the second sensing mechanism 12. The first protruding member 113 may be arranged to drive the first elastic member 112 to move correspondingly, thus causing mechanical deformation thereof. When the external load reaches a predetermined threshold, the first elastic member 112 may be deformed to push the second protruding member 1213 and the second elastic member 1212 through the central cavity 1222 of the retention member 122, causing the second elastic member 1212 to deform as well. The deformation of the first elastic member 112 and the second elastic member 1212 may be measured by the first movement detection device 114 and the second movement detection device 1214 which then convert the movement into corresponding electrical signals respectively. The electrical signals may then be processed by the central processing unit 30 which may combine the weight measured by all weight sensors and determine the total weight applied on the weighing platform 20.

When an external load is exerted on the weighing platform 20 exceeds a predetermined threshold, the second elastic member 1212 (as well as the first elastic member 112) may bias against the lower biasing end 1231A of the blocking member 123A. This arrangement may prevent the first elastic member 112 and the second elastic member 1212 from being deformed excessively.

The weighing platform 20, the first sensing mechanism 11 and the second sensing mechanism 121 in this fifth alternative mode may be structurally identical to what was described in the preferred embodiment above.

Embodiments of the present disclosure, while illustrated and described in terms of disclosed embodiments and several alternatives, is not limited to the particular description contained in this specification. Additional alternative or equivalent components could also be used to practice embodiments of the present disclosure.

What is claimed is:

1. A digital scale, comprising:
   a weighing platform:
   a plurality of weight sensors provided underneath said weighing platform, each of said weight sensors comprising:
   a first sensing mechanism, which comprises:
   a first securing member, having a first boundary portion and a first through cavity formed within said first boundary portion,
   a first elastic member movably attached on said first securing member said first elastic member extending from said first boundary portion and being positioned in said first through cavity;
   a first movement detection device connected to said first elastic member, said first movement detection device being arranged to transform a movement of said first elastic member to a corresponding first electrical signal; and
   a first protruding member extending from said first elastic member and is arranged to normally bias against a flat surface;
   a second sensing mechanism provided between said first sensing mechanism and said weighing platform, said second sensing mechanism comprising:
   a second securing member;
   a second elastic member movably attached on said second securing member;
   a second movement detection device connected to said second elastic member, said second movement detection device being arranged to transform a movement of said second elastic member to a corresponding second electrical signal, wherein when an external load which is greater than a predetermined threshold is applied on said weighing platform, said first elastic member is arranged to be driven to move by said external load and push said second elastic member to move with respect to said second securing member; and
   a second protruding member extended from said second elastic member toward said first sensing mechanism, in such a manner that when said first elastic member is pushed toward said second sensing mechanism by said external load, said first protruding member is driven to move by a corresponding reaction force to drive said first elastic member to move toward said second sensing mechanism so as to allow said first elastic member to eventually bias against said second protruding member which then drives said second elastic member to move correspondingly, so that said external load is distributed on said first sensing mechanism and said second sensing mechanisms for preventing damage to any one of said first sensing mechanism and said second sensing mechanism without affecting an overall accuracy of said digital scale; and a central processing unit electrically connected to said first sensing mechanism and said second sensing mechanism, a magnitude of said external load being obtained by combining and processing said first electrical signal and said second electrical signal.

2. The digital scale, as recited in claim 1, wherein said first elastic member has a first elastic portion and a second elastic portion, said second elastic portion extending from said first boundary portion of said first securing member, said first elastic portion extending from said second elastic portion to form a substantially C-shaped cross section of said first elastic member, said first movement detection device being attached on said second elastic portion of said first elastic member.

3. The digital scale, as recited in claim 2, wherein said second securing member has a second boundary portion and a second through cavity formed within said second boundary portion, said second elastic member extending from said second boundary portion and being positioned in said second through cavity.

4. The digital scale, as recited in claim 3, wherein said second elastic member has a third elastic portion and a fourth elastic portion, said fourth elastic portion extending from said second boundary portion of said second securing member, said third elastic portion extending from said fourth elastic portion to form a substantially C-shaped cross section of said second elastic member, said second movement detection device being attached on said fourth elastic portion of said second elastic member.

5. The digital scale, as recited in claim 4, wherein said first protruding member protruding from said first elastic portion of said first elastic member while said second protruding member protruding from said third elastic portion of said second elastic member toward said first sensing mechanism.

6. The digital scale, as recited in claim 5, wherein said first protruding member and said second protruding member are positioned coaxially and aligned with each other.

7. The digital scale, as recited in claim 6, wherein said second sensing mechanism further comprises a retention member extended between said first securing member and said second securing member so as to maintain a distance between said first securing member and said second securing member.

8. The digital scale, as recited in claim 7, wherein said retention member is configured as having a loop-shaped structure sandwiched between said first securing member and said second securing member, said retention member having a peripheral portion and a central cavity formed within said peripheral portion, wherein said first elastic member is arranged to move to bias against said second elastic member through said central cavity.

9. The digital scale, as recited in claim 5, wherein at least one of said weight sensors further comprises a blocking member positioned above said second elastic member for limiting deformation of said second elastic member and said first elastic member, said blocking member being configured as having an elongated structure having one end connected to said weighing platform, and a lower biasing end extending toward said corresponding second elastic member.

10. The digital scale, as recited in claim 8, wherein at least one of said weight sensors further comprises a blocking member positioned above said second elastic member for limiting deformation of said second elastic member and said first elastic member, said blocking member being configured as having an elongated structure having one end connected to said weighing platform, and a lower biasing end extending toward said corresponding second elastic member.

11. The digital scale, as recited in claim 5, further comprising a plurality of supporting legs mounted underneath said weighing platform, wherein each of said first sensing mechanism and said second sensing mechanism are supported by said corresponding supporting leg, each of said supporting legs being configured to have a tubular structure for connecting to and supporting said corresponding first sensing mechanism and said corresponding second sensing mechanism.

12. The digital scale, as recited in claim 10, further comprising a plurality of supporting legs mounted underneath said weighing platform, wherein each of said first sensing mechanism and said second sensing mechanism are supported by said corresponding supporting leg, each of said supporting legs being configured to have a tubular structure for connecting to and supporting said corresponding first sensing mechanism and said corresponding second sensing mechanism.

13. A digital scale, as recited in claim 4, comprising:
a weighing platform:
a plurality of weight sensors provided underneath said weighing platform, each of said weight sensors comprising:
a first sensing mechanism, which comprises:
a first securing member having a first boundary portion and a first through cavity formed within said first boundary portion,
a first elastic member movably attached on said first securing member, and extending from said first boundary portion and being positioned in said first through cavity; wherein said first elastic member having a first elastic portion and a second elastic portion, said second elastic portion extending from said first boundary portion of said first securing member, said first elastic portion extending from said second elastic portion to form a substantially C-shaped cross section of said first elastic member, said first movement detection device being attached on said second elastic portion of said first elastic member; and
a first movement detection device connected to said first elastic member in such a manner that when an external load is applied on said weighing platform, said first elastic member is arranged to be driven to move by said external load, said first movement detection device being arranged to transform a movement of said first elastic member to a corresponding first electrical signal; and
a first protruding member extending from said first elastic member, wherein said first protruding member is arranged to normally bias against a flat surface;
a blocking member positioned above said first elastic member for limiting an extent of deformation of said first elastic member, said blocking member being configured to have an elongated structure having one end connected to said weighing platform and a lower biasing end extending toward said first elastic member for limiting said first elastic member, so that when said external load is applied on said weighing platform, said first protruding member is driven to move by a corresponding reaction force so as to drive said first elastic member to move toward said blocking member, in such a manner that said external load is distributed on said first sensing mechanism and blocking member for preventing damage to said first sensing mechanism without affecting an overall accuracy of said digital scale; and a central processing unit electrically connected to said first sensing mechanism, a magnitude of said external load being obtained by processing said first electrical signal.

14. The digital scale, as recited in claim 13, further comprising a plurality of supporting legs mounted underneath said weighing platform, wherein each of said first sensing mechanism is supported by said corresponding supporting leg, each of said supporting legs being configured to have a tubular structure for connecting to and supporting said corresponding first sensing mechanism.

* * * * *